Figure 1:
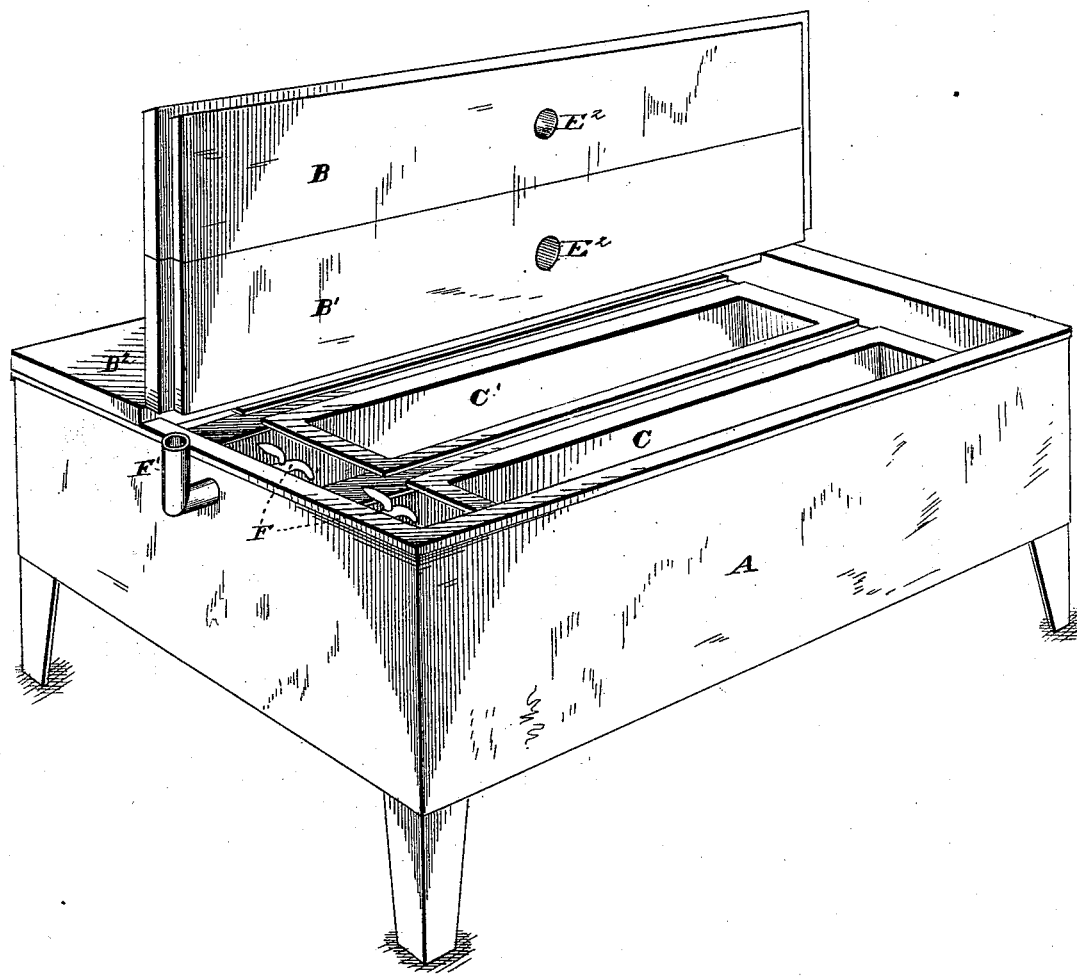

2 Sheets—Sheet 1.

M. S. ALLYN.
Milk-Cooler.

No. 207,584. Patented Sept. 3, 1878.

WITNESSES
E. J. Nottingham
N. W. Bright

INVENTOR
Marvin S. Allyn
By Leggett and Leggett
ATTORNEYS

2 Sheets—Sheet 2.
M. S. ALLYN.
Milk-Cooler.
No. 207,584. Patented Sept. 3, 1878.
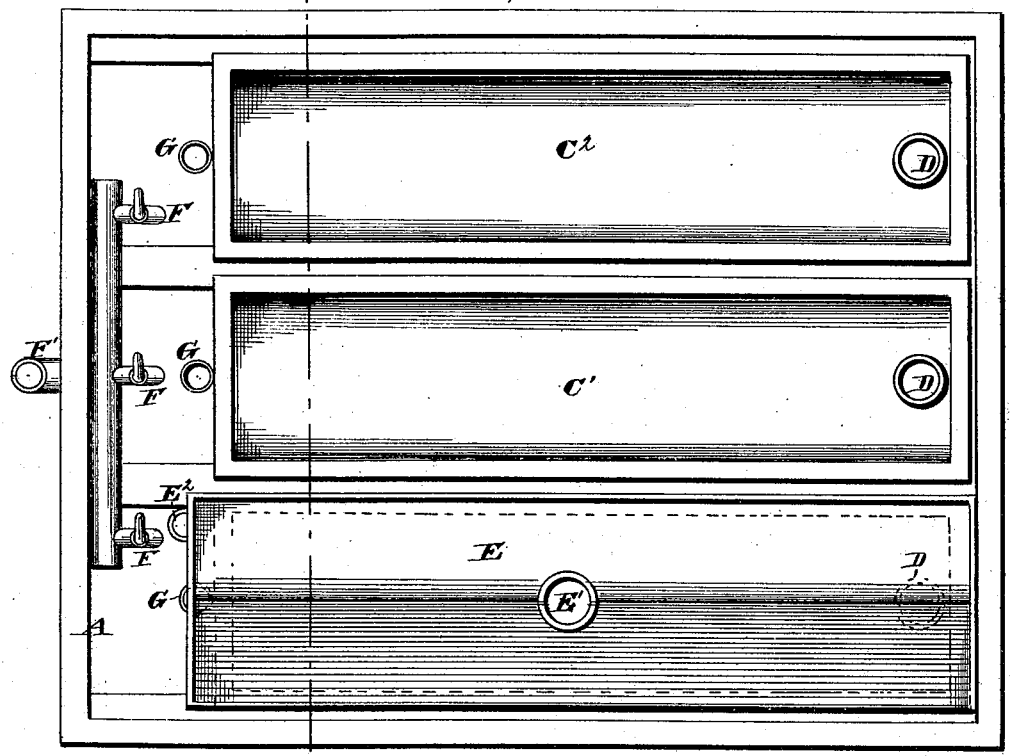
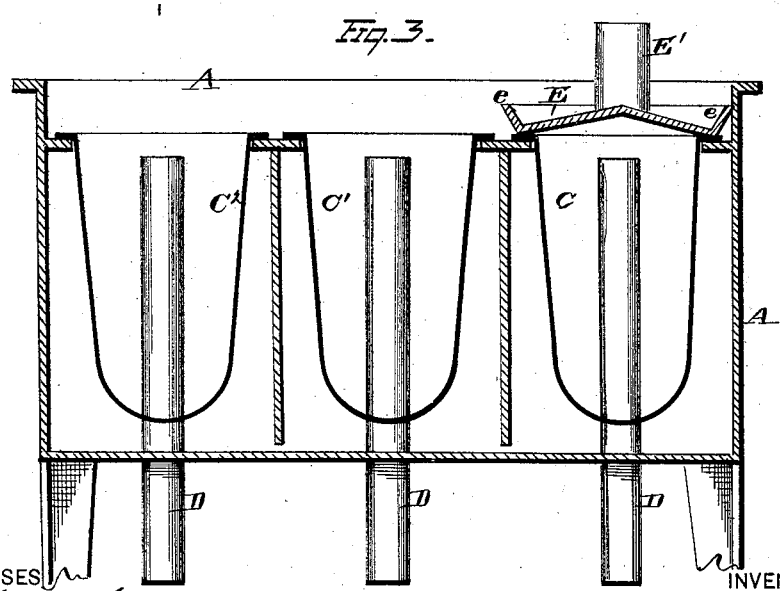
WITNESSES
E. S. Nottingham
A. W. Bright
INVENTOR
Marvin S. Allyn.
By Leggett and Leggett,
ATTORNEYS

UNITED STATES PATENT OFFICE.

MARVIN S. ALLYN, OF HART'S GROVE, OHIO.

IMPROVEMENT IN MILK-COOLERS.

Specification forming part of Letters Patent No. 207,584, dated September 3, 1878; application filed May 4, 1878.

*To all whom it may concern:*

Be it known that I, MARVIN S. ALLYN, of Hart's Grove, in the county of Ashtabula and State of Ohio, have invented certain new and useful Improvements in Milk-Coolers; and I do hereby declare the following to be a full, clear, and exact description of the invention, such as will enable others skilled in the art to which it pertains to make and use it, reference being had to the accompanying drawings, which form part of this specification.

My invention relates to improvements in apparatus for cooling milk and keeping the same at the proper temperature for yielding the largest amount of cream.

In the drawings, Figure 1 is a perspective view of my device with the outer or wooden cover partially removed. Fig. 2 is a plan view with outer wooden cover wholly removed, and the inner metal covers of the pans all removed except one. Fig. 3 is a vertical sectional view of my device.

A is a suitable rack or box, preferably made of wood, to accommodate the pans and other parts of my device. This box A is supplied with a cover, B, hinged in such a manner that either outside pan or vat may be uncovered only, or either outside with the center pan uncovered and the other remain closed. The box or casing A is preferably lined with sheet metal, leaving an air-tight chamber between the lining and the outside box or frame.

C, $C^1$, and $C^2$ are pans or vessels constructed of any suitable length, and conoidal in form, as shown in Fig. 3. These pans are supplied with covers E, pyramidal in shape, having a flange, $e$, turned on its outer edges for holding the water or ice in place. If ice is used it may be placed upon the cover, and the waste-water therefrom will pass off through the outlet $E^2$, Fig. 2; or if water is used a hose-connection may be made between the faucet F and the cover, and the water made to pass down one side and back to the outlet $E^2$ over the other side of the cover.

D D D are air-tubes passing from near the top of the pans C, $C^1$, and $C^2$ through their bottoms, and thence through the bottom of the box or casing A. The several divisions B, $B^1$, and $B^2$ of the folding cover are, respectively, provided with openings $E^2$ for the passage of the tubes $E^1$, as the latter thus pass up through the said cover.

F are suitable cocks or faucets for admitting the water into the casing A. G G G are outlet-pipes extending through the bottom of the casing to near the top of the pans. These outlet-pipes may be perforated at different heights, so that the depth of water in the casing may be regulated as desired, either covering any portion of the pan or the whole of it submerged to the rim.

Having thus described its construction, its mode of operation is as follows: The milk is placed in the outer pans, C and $C^1$, the water is let in through the faucets F, and the overflow passes out through the outlet-pipes G. The metallic covers E may be covered with ice or water, but preferably with ice, the water from the same passing off into the casing A through the outlet $E^2$. The pans having thus been packed and submerged, the outer wooden covers B, $B^1$, and $B^2$ are placed in position. Now, by means of the ventilating-pipes $E^1$ and D, a thorough circulation of air is produced over the surface of the milk. The milk thus packed and surrounded with water should stand about twelve hours. The covers E should then be removed and the milk allowed to stand undisturbed twelve hours longer, when the cream will be found thoroughly hardened and ready to be removed. This can be done and the cream stored in center pan or vat, $C^1$. The size of the pans should be regulated by the size of dairy or amount of milk produced, and should be made sufficiently large to hold the product of one milking.

The cream having been removed, the upper part of the ventilating-pipe D is disconnected from the lower at the point of intersection with the pan and removed. The lower portion of the pipe D now becomes an outlet-pipe for the milk, and its flow may be regulated by a stop-cock or other device. Owing to the peculiar conoidal shape of the pans, any number of gallons up to the capacity of the pans may be stored with equally good results.

Having thus described the construction and operation of my device, what I claim as new, and desire to secure by Letters Patent, is—

1. In combination with a milk cooler, the ventilating-pipes D and $E^1$, the former entering the bottom of the cooler and extending above the level of the milk, the latter entering the top of the cooler, substantially as set forth.

2. In a milk-cooler, the combination of the pan C with the ventilating-pipe D, metallic cover E, provided with the ventilating-pipe $E^1$, outlet-pipe G, case A, and folding cover B, substantially as set forth.

3. In a milk-cooler, the combination, with the three pans, arranged side by side together, and provided with metallic lids having ventilating-tubes, of the loose cover which fits over the same and has openings corresponding to said ventilating-tubes, said loose cover being made with divisions hinged together and adapted to simultaneously uncover any two of the said pans, substantially as set forth.

In testimony whereof I have signed my name to this specification in the presence of two subscribing witnesses.

MARVIN S. ALLYN.

Witnesses:
JNO. CROWELL, Jr.,
W. E. DONNELLY.